US012462451B2

(12) United States Patent
Cui et al.

(10) Patent No.: US 12,462,451 B2
(45) Date of Patent: Nov. 4, 2025

(54) REUSE OF INFOGRAPHICS

(71) Applicant: Microsoft Technology Licensing, LLC, Redmond, WA (US)

(72) Inventors: Weiwei Cui, Redmond, WA (US); Jinpeng Wang, Redmond, WA (US); He Huang, Beijing (CN); Yun Wang, Saratoga, CA (US); Haidong Zhang, Beijing (CN); Chin-Yew Lin, Redmond, WA (US); Dongmei Zhang, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 345 days.

(21) Appl. No.: 18/020,360

(22) PCT Filed: Jun. 30, 2021

(86) PCT No.: PCT/US2021/039734
§ 371 (c)(1),
(2) Date: Feb. 8, 2023

(87) PCT Pub. No.: WO2022/072023
PCT Pub. Date: Apr. 7, 2022

(65) Prior Publication Data
US 2023/0316604 A1    Oct. 5, 2023

(30) Foreign Application Priority Data

Sep. 30, 2020  (CN) .......................... 202011069586.9

(51) Int. Cl.
*G06T 11/20* (2006.01)
*G06T 7/11* (2017.01)
(52) U.S. Cl.
CPC .............. *G06T 11/206* (2013.01); *G06T 7/11* (2017.01); *G06T 2200/24* (2013.01)

(58) Field of Classification Search
None
See application file for complete search history.

(56) References Cited

U.S. PATENT DOCUMENTS 8,605,090 B2 * 12/2013 Garg .................. G06T 11/206
345/440
11,200,715 B1 * 12/2021 Takuma ................. G06F 40/30
(Continued)

FOREIGN PATENT DOCUMENTS

| CN | 107408113 A | 11/2017 |
| CN | 110222194 A | 9/2019 |

(Continued)

OTHER PUBLICATIONS

Office Action Received for Chinese Application No. 202011069586.9, mailed on Oct. 31, 2024, 17 pages. (English translation Provided).
(Continued)

*Primary Examiner* — Jason A Pringle-Parker
(74) *Attorney, Agent, or Firm* — Schwegman Lundberg & Woessner, P.A.

(57) ABSTRACT

In accordance with the implementations of the subject matter described herein, there is provided a solution for reusing infographics. In this solution, a group of visual element units is determined from a visual element set comprised in the original infographic. A visual element unit in the group represents an information item in the original infographic. A first correlation between a visual element contained in the visual element unit and the information item and a second correlation between the visual element unit and a further visual element unit in the group are determined. A description for the original infographic is generated based on the first and second correlations. A target infographic is generated by updating the group of visual element units at least based on the description and the target information. In (Continued)

this way, infographics can be converted into reusable templates, thereby simplifying reuse of such infographics and improving user experience.

20 Claims, 8 Drawing Sheets

(56) References Cited

U.S. PATENT DOCUMENTS

| | | | |
|---|---|---|---|
| 2007/0003147 | A1 | 1/2007 | Viola et al. |
| 2013/0187926 | A1 | 7/2013 | Silverstein et al. |
| 2014/0380178 | A1* | 12/2014 | Kapahi ............... G06T 11/206 715/738 |
| 2015/0254369 | A1 | 9/2015 | Hou et al. |
| 2015/0262396 | A1* | 9/2015 | Devarajan ............ H04L 67/02 345/440.1 |
| 2016/0026353 | A1 | 1/2016 | Ntouanoglou |
| 2016/0042041 | A1 | 2/2016 | Smith et al. |
| 2016/0110895 | A1 | 4/2016 | Broadbent |
| 2018/0181556 | A1 | 6/2018 | Chang et al. |

FOREIGN PATENT DOCUMENTS

| | | |
|---|---|---|
| CN | 110888975 A | 3/2020 |
| CN | 111159987 A | 5/2020 |

OTHER PUBLICATIONS

Zhu-Tian, et al., "Towards Automated Infographic Design: Deep Learning-based Auto-Extraction of Extensible Timeline", In Journal of IEEE Transactions on Visualization and Computer Graphics, vol. 26, Issue 1, Aug. 16, 2019, pp. 917-926.
"Standard ECMA-376: Office Open XML File Formats", Retrieved From: https://www.ecma-international.org/publications-and-standards/standards/ecma-376/, Dec. 2021, 2 Pages.
Al-Zaidy, et al., "Automatic Extraction of Data from Bar Charts", In Proceedings of the 8th International Conference on Knowledge Capture, Oct. 7, 2015, 4 Pages.
Bateman, et al., "Useful Junk? The Effects of Visual Embellishment on Comprehension and Memorability of Charts", In Proceedings of the Conference on Human Factors in Computing Systems, Apr. 10, 2010, pp. 2573-2582.
Battle, et al., "Beagle: Automated Extraction and Interpretation of Visualizations from the Web", In Proceedings of the 2018 Conference on Human Factors in Computing Systems, Apr. 21, 2018, pp. 1-8.
Borkin, et al., "Beyond Memorability: Visualization Recognition and Recall", In Journal of IEEE Transactions on Visualization and Computer Graphics, vol. 22, Issue 1, Jan. 2016, pp. 519-528.
Brosz, et al., "Transmogrification: Casual Manipulation of Visualizations", In Proceedings of the 26thAnnual ACM Symposium on user Interface Software and Technology, Oct. 8, 2013, pp. 97-106.
Bylinskii, et al., "Learning Visual Importance for Graphic Designs and Data Visualizations", In Proceedings of the 30th Annual ACM Symposium on user Interface Software and Technology, Oct. 20, 2017, pp. 57-69.
Bylinskii, et al., "Understanding Infographics through Textual and Visual Tag Prediction", In Repository of arXiv:1709.09215v1, Sep. 26, 2017, 11 Pages.
Wang, et al., "InfoNice: Easy Creation of Information Graphics", In Proceedings of the CHI Conference on Human Factors in Computing Systems, Apr. 21, 2018, pp. 1-12.

Chen, et al., "Towards Automated Infographic Design: Deep Learning-based Auto-Extraction of Extensible Timeline", In Journal of the IEEE Transactions on Visualization and Computer Graphics, vol. 26, Issue 1, Jan. 1, 2020, pp. 917-926.
Choi, et al., "Visualizing for the Non-Visual: Enabling the Visually Impaired to Use Visualization", In Computer Graphics Forum, vol. 38, Issue 3, Jun. 1, 2019, 13 Pages.
Cui, et al., "Text-to-Viz: Automatic Generation of Infographics from Proportion-Related Natural Language Statements", In Journal of IEEE Transactions on Visualization and Computer Graphics, Aug. 26, 2019, pp. 906-916.
Elzer, et al., "The Automated Understanding of Simple Bar Charts", In Journal of Artificial Intelligence, vol. 175, Issue 2, Feb. 1, 2011, pp. 526-555.
Harper, et al., "Converting Basic D3 Charts into Reusable Style Templates", In Journal of IEEE Transactions on Visualization and Computer Graphics, vol. 24, Issue 3, Feb. 7, 2017, pp. 1274-1286.
Harper, et al., "Deconstructing and Restyling D3 Visualizations", In Proceedings of the 27th Annual ACM Symposium on user Interface Software and Technology, Oct. 5, 2014, pp. 253-262.
Harrison, et al., "Infographic Aesthetics: Designing for the First Impression", In Proceedings of the 33rd Annual ACM Conference on Human Factors in Computing Systems, Apr. 18, 2015, pp. 1187-1190.
Hoque, et al., "Searching the Visual Style and Structure of D3 Visualizations", In Journal of IEEE transactions on Visualization and Computer Graphics, vol. 26, Issue 1, Aug. 22, 2019, pp. 1236-1245.
Huang, et al., "A System for Understanding Imaged Infographics and Its Applications", In Proceedings of the ACM Symposium on Document Engineering, Aug. 28, 2007, pp. 9-18.
Johnson, C.S., "Hierarchical Clustering Schemes", In Journal of the Psychometrika, vol. 32, Issue 3, Sep. 1, 1967, pp. 241-254.
Jung, et al., "ChartSense: Interactive Data Extraction from Chart Images", In Proceedings of the Conference on Human Factors in Computing Systems, May 6, 2017, pp. 6706-6717.
Ke, et al., "LightGBM: A Highly Efficient Gradient Boosting Decision Tree", In Journal of the Advances in Neural Information Processing Systems, Dec. 4, 2017, 9 Pages.
Kim, et al., "Data-Driven Guides: Supporting Expressive Design for Information Graphics", In Journal of IEEE Transactions on Visualization and Computer Graphics, vol. 23, Issue 1, Jan. 2017, pp. 491-500.
Kong, et al., "Graphical Overlays: Using Layered Elements to Aid Chart Reading", In Journal of IEEE transactions on Visualization and Computer Graphics, Oct. 8, 2012, pp. 2631-2638.
Kuhn, H.W., "The Hungarian Method for the Assignment Problem", In Naval Research Logistics Quarterly, vol. 2, 1, Mar. 1, 1995, pp. 83-97.
Liu, et al., "Data Illustrator: Augmenting Vector Design Tools with Lazy Data Binding for Expressive Visualization Authoring", In Proceedings of the Conference on Human Factors in Computing Systems, Apr. 21, 2018, pp. 1-13.
Madan, et al., "Synthetically Trained Icon Proposals for Parsing and Summarizing Infographics", In Repository of arXiv:1807.10441v1, Jul. 27, 2018, 16 Pages.
Mendez, et al., "IVoLVER: Interactive Visual Language for Visualization Extraction and Reconstruction", In Proceedings of the Conference on Human Factors in Computing Systems, May 7, 2016, pp. 4073-4085.
Moere, et al., "On the Role of Design in Information Visualization", In Journal of Information Visualization, vol. 10, Issue 4, Oct. 1, 2011, pp. 356-371.
"International Search Report and Written Opinion Issued in PCT Application No. PCT/US2021/039734", Mailed Date: Nov. 10, 2021, 11 Pages.
Poco, et al., "Extracting and Retargeting Color Mappings from Bitmap Images of Visualizations", In Journal of IEEE Transactions on Visualization and Computer Graphics, vol. 24, Issue 1, Aug. 29, 2017, pp. 637-646.
Poco, et al., "Reverse-Engineering Visualizations: Recovering Visual Encodings from Chart Images", In Computer Graphics Forum, vol. 36, Jul. 4, 2017, 11 Pages.

(56) References Cited

OTHER PUBLICATIONS

Ren, et al., "Charticulator: Interactive Construction of Bespoke Chart Layouts", In Journal of IEEE transactions on Visualization and Computer Graphics vol. 25, Issue 1, Aug. 20, 2018, pp. 789-799.

Ren, et al., "IVisDesigner: Expressive Interactive Design of Information Visualizations", In Journal of IEEE Transactions on Visualization and Computer Graphics, vol. 20, Issue 12, Dec. 2014, pp. 2092-2101.

Satyanarayan, et al., "Lyra: An Interactive Visualization Design Environment", In Computer Graphics Forum, vol. 33, Jul. 12, 2014, 10 Pages.

Xia, et al., "DataInk: Direct and Creative Data-Oriented Drawing", In Proceedings of the Conference on Human Factors in Computing Systems, Apr. 21, 2018, pp. 1-13.

Savva, et al., "ReVision: Automated Classification, Analysis and Redesign of Chart Images", In Proceedings of the 24th Annual ACM Symposium on user Interface Software and Technology, Oct. 16, 2011, pp. 393-402.

Siegel, et al., "FigureSeer: Parsing Result-Figures in Research Papers", In Proceedings of European Conference on Computer Vision, Oct. 8, 2016, 16 Pages.

Skau, et al., "Readability and Precision in Pictorial Bar Charts", In Proceedings of the Eurographics/IEEE VGTC Conference on Visualization, Jun. 12, 2017, pp. 91-95.

Thompson, et al., "Understanding Data-Driven Visual Encodings Through Deconstruction", In Journal of Poster at IEEE VIS, Oct. 23, 2016, 2 Pages.

Wang, et al., "DataShot: Automatic Generation of Fact Sheets from Tabular Data", In Journal of IEEE Transactions on Visualization and Computer Graphics, vol. 26, Issue 1, Aug. 19, 2019, pp. 895-905.

Yang, Chelsea, "How to Export Infographics to SVG", Retrieved From: https://web.archive.org/web/20210115214811/https://www.edrawsoft.com/infographics/how-to-export-infographic-to-svg.html, Jan. 15, 2021, 3 Pages.

Notice of Grant Received for Chinese Application No. 202011069586.9, mailed on Apr. 15, 2025, 04 pages. (English Translation Provided).

\* cited by examiner

REUSE OF INFOGRAPHICS

This application is a U.S. National Stage Filing under 35 U.S.C. 371 of International Patent Application Serial No. PCT/US2021/039734, filed Jun. 30, 2021, and published as WO 2022/072023 A1 on Apr. 7, 2022, which application claims the benefit of priority to Chinese Patent Application No. 202011069586.9, filed Sep. 30, 2020, which applications and publication are hereby incorporated herein by reference in their entirety.

BACKGROUND

As a common type of visualization, infographics (e.g., bar charts, and the like) have been widely used for displaying information, such as scripts, presentations, and the like, so as to make information display more eye-catching, enhance information visualization, and make information and data being displayed more intuitive and clearer. However, unlike standard charts that are innately supported by existing software, these infographic-style charts are often created manually by infographic designers with tools. Since these charts are merely composed of original visual elements, such as text blocks and graphics, updating or reusing them in the future requires fine-grained manual edits, which is often a tedious and error-prone process. Moreover, manual editing operations require a good knowledge of users on the related tools, bringing about inconvenience for normal users.

SUMMARY

In accordance with the implementations of the subject matter described herein, there is provided a solution for reusing infographics. In this solution, if it is determined that an original infographic is received, a group of visual element units is determined from a visual element set comprised in the original infographic. A visual element unit in the group of visual element units represents an information item in the original infographic. A first correlation between a visual element contained in the visual element unit and the information item and a second correlation between the visual element unit and a further visual element unit in the group of visual element units are determined. A description for the original infographic is generated based on the first correlation and the second correlation. If an input of target information is detected, a target infographic is generated by updating the group of visual element units at least based on the description and the target information. In this way, the infographics can be converted into a reusable template, thereby simplifying reuse of such infographics and improving user experience.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Throughout the drawings, the same or similar symbols refer to the same or similar elements.

DETAILED DESCRIPTION

Some example implementations of the subject matter described herein will be described below with reference to the accompanying drawings. It should be appreciated that those implementations are discussed only for the purpose of enabling those skilled in the art to better understand and thus implement the subject matter described herein, rather than suggesting any limitation to the scope of the subject matter.

As used herein, the term "includes" and its variants are to be read as open-ended terms that mean "includes, but is not limited to." The term "based on" is to be read as "based at least in part on." The term "an implementation" and "one implementation" are to be read as "at least one implementation." The term "another implementation" is to be read as "at least one another implementation." The term "first," "second" or the like may represent different or the same objects. Other definitions, either explicit or implicit, may be included below.

Basic Working Principle and Example Environment

Figure 1:
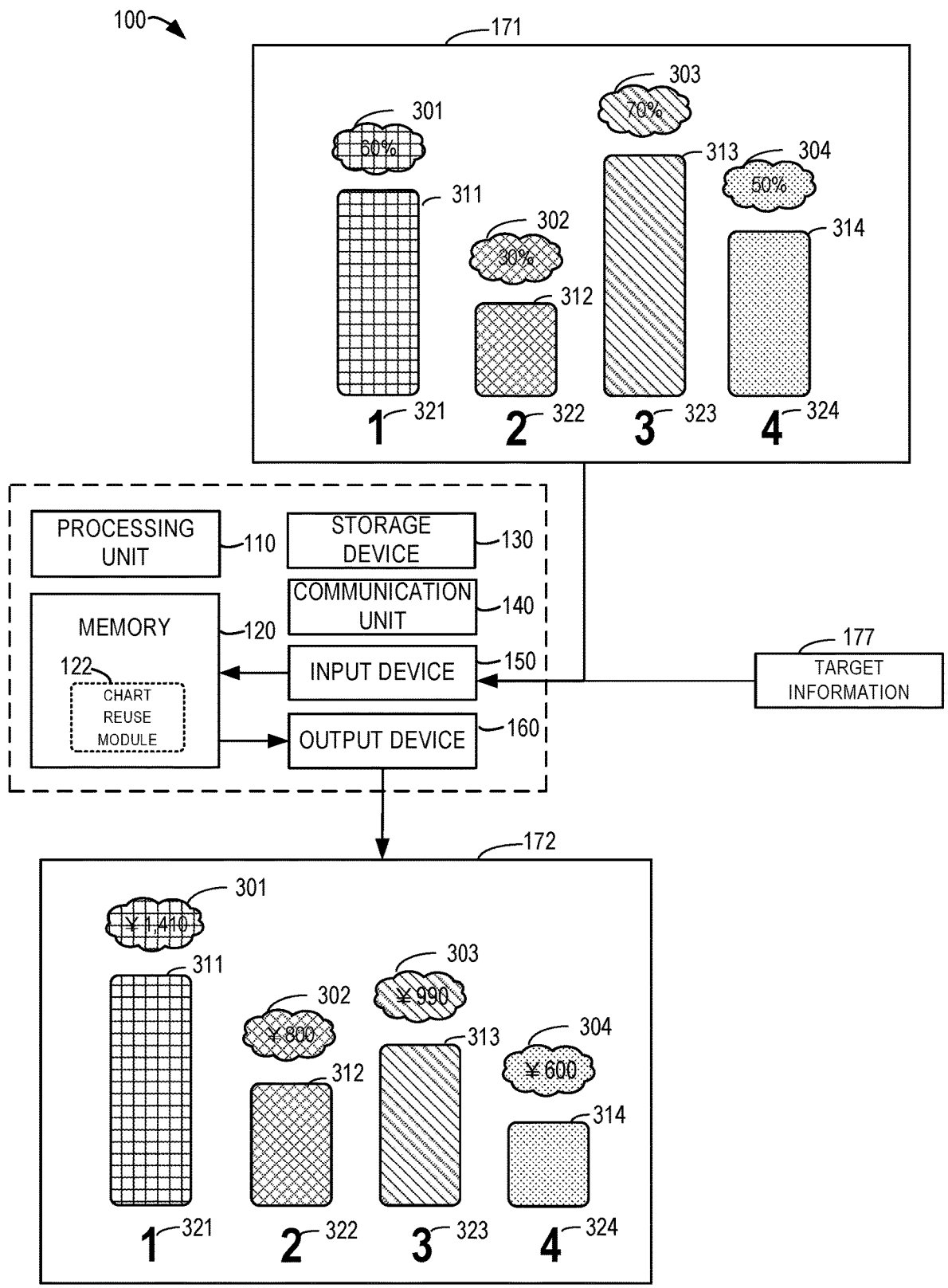
FIG. 1 illustrates a schematic diagram of a computing device in which various implementations of the subject matter described herein can be implemented.

Basic principles and various example implementations of the subject matter described herein will now be described with reference to the drawings. FIG. 1 illustrates a block diagram of a computing device 100 in which various implementations of the subject matter described herein can be implemented. It should be appreciated that the computing device 100 shown in FIG. 1 is merely for illustration, without suggesting any limitation to the functions and scopes of implementations of the subject matter described herein in any manner. As shown in FIG. 1, the computing device 100 includes a computing device 100 in a form of a general-purpose computing device. Components of the computing device 100 may include, but are not limited to, one or more processors or processing units 110, a memory 120, a storage device 130, one or more communication units 140, one or more input devices 150, and one or more output devices 160.

In some implementations, the computing device 100 may be implemented as various user terminals or service terminals. The service terminals may be servers provided by various service providers, large-scale computing devices, and the like. For example, a user terminal may be any type of mobile terminal, fixed terminal or portable terminal, including a mobile telephone, a station, unit, device, multimedia computer, multimedia tablet, Internet node, communicator, desktop computer, laptop computer, notebook computer, netbook computer, tablet computer, personal communication system (PCS) device, personal navigation device, personal digital assistant (PDA), audio/video player, digital camera/video camera, positioning device, TV receiver, radio broadcast receiver, electronic-book device, gaming device or any combination thereof, including accessories and peripherals of these devices or any combination thereof. It should be appreciated that the computing device 100 can support any type of interface for a user (such as a "wearable" circuit and the like).

The processing unit 110 may be a physical or virtual processor and can perform various processing based on programs stored in the memory 120. In a multi-processor system, multiple processing units execute computer-executable instructions in parallel so as to improve the parallel processing capacity of the computing device 100. The processing unit 110 may also be referred to as a central processing unit (CPU), microprocessor, a controller or a microcontroller.

The computing device 100 typically includes a plurality of computer storage mediums. Such a medium may be any available media accessible by the computing device 100, including, but not limited to, volatile and non-volatile medium, and removable and non-removable medium. The memory 120 may be a volatile memory (for example, a register, a cache, a random access memory (RAM)), a non-volatile memory (for example, a read-only memory (ROM), electrically erasable programmable read-only memory (EEPROM), flash memory), or any combination thereof. The storage device 130 may be any removable or non-removable medium, and may include a machine-readable medium, such as a flash drive, disk or any other medium, which can be used for storing information and/or data and accessed in the computing device 100.

The computing device 100 may further include additional removable/non-removable, volatile/non-volatile memory media. Although not shown in FIG. 1, a disk drive may be provided for reading or writing a removable and non-volatile disk and a disc drive may be provided for reading or writing a removable non-volatile disc. In these cases, each drive may be connected to a bus (not shown) via one or more data medium interfaces.

The communication unit 140 communicates with a further computing device via communication media. Additionally, functions of components in the computing device 100 may be implemented by a single computing cluster or multiple computing machines that can communicate via connections. Therefore, the computing device 100 may operate in a networked environment using a logical link with one or more other servers, network personal computers (PCs) or further general network nodes.

The input device 150 may include one or more of a variety of input devices, such as a mouse, a keyboard, a tracking ball, a voice-input device, and the like. The output device 160 may be one or more of a variety of output devices, such as a display, a loudspeaker, a printer, and the like. By means of the communication unit 140, the computing device 100 may further communicate with one or more external devices (not shown) such as the storage device, display device, and the like, with one or more devices that enable users to interact with the computing device 100, or any devices (for example, a network card, a modem, and the like) that enable the computing device 100 to communicate with one or more other computing devices, if required. Such communication may be performed via an input/output (I/O) interface (not shown).

In some implementations, as an alternative of being integrated on a single device, some or all components in the computing device 100 may also be provided in the form of cloud computing architecture. In the cloud computing architecture, these components may be provided remotely and work together to implement the functions described herein. In some implementations, the cloud computing provides computing, software, data access and storage services, which will not require end users to be aware of the physical location or configuration of the system or hardware that provides these services. In various implementations, the cloud computing provides the services via a wide area network (for example, Internet) using an appropriate protocol. For example, a cloud computing provider provides applications via a wide area network, which can be accessed through a web browser or any other computing components. Software or components of the cloud computer architecture and respective data may be stored on a server at a remote location. Computing resources in a cloud computing environment may be merged or distributed at a location in a remote data center. Cloud computing infrastructures may provide the services through a shared data center, though they behave as a single access point for users. Hence, the cloud computing architecture may be used to provide components and functions described herein from a service provider at a remote location. Alternatively, they may be provided from conventional servers, or installed directly or otherwise on a client device.

The computing device 100 may be used to implement reuse of infographics in various implementations of the subject matter described herein. The memory 120 may include one or more modules, each of which includes one or more program instructions, which can be accessed and operated by the processing unit 110, so as to implement functions of various implementations described herein. For example, the memory 120 may include a chart reuse module 122 for reusing infographics.

The computing device 100 may receive an original infographic 171 via the input device 150. The original infographic 171 is provided to the input device 150, such that the original infographic 121 is to be reused by the chart reuse module 122.

Reusing, by the chart reuse module 122, the original infographic 171 may include deconstructing the original infographic 171 and updating the same. During deconstruction, the chart reuse module 122 may analyze composition of a visual element set in the original infographic 171 and determine a correlation between the visual elements and the infographic information. During updating, if new chart information is received, the chart reuse module 122 may update the original infographic 171, based on the correlation between the visual elements and the chart information determined during the deconstruction and the new chart information, so as to generate a target infographic 172.

The chart reuse module 122 may determine a group of visual element units 173, 174, 175 and 176 from the visual element set of the original infographic 171. Each visual element unit in the group of visual element units may represent an information item in the original infographic 171. For example, the visual element unit 173 may indicate "the business growth rate of the first sales group is 60%."

The chart reuse module 122 then may determine the first correlation between the visual elements contained in the visual element unit and the information item. For example, the first correlation may be determined based on property information of the visual elements per se contained in the visual element unit, such as types of visual elements, filling color, and the like, and an influence mode of a semantic change of the information item on the visual element contained in the visual element unit. The influence mode, for example, may include a change (including a morphing, a movement, a change in color, a change in arrangement and combination, and the like) of the visual element along with the change of the information item.

The chart reuse model 122 may determine the second correlation between a visual element contained in the visual element unit and visual elements contained in a further visual element unit. For example, the correlation may include the same or similar element property between two visual element units, or may characterize a correlation between visual elements having the same or similar semantic meanings. The correlation, for example, may involve alignment between elements, geometric consistency, size consistency, color consistency, presence consistency, and the like.

Based on the first correlation between visual elements contained in the visual element unit and the information item, and the second correlation between visual elements contained in the visual element unit and visual elements contained in the further visual element unit, the chart reuse module 122 may generate description for the original infographic 171. The correlations described above may be represented by predetermined tags, for example. The predetermined tags may be attached to visual elements of the original infographic 171 via a trained machine learning model.

In the course of updating the original infographic 171, if detecting that target information 177 is input to the input device 150, the chart reuse module 122 may update, based on the target information 177 and the generated description for the original infographic 171, the group of visual element units so as to generate a target infographic 172.

Updating of the original infographic 171 may include, for example, updating visual elements in a visual element unit and updating visual elements across the visual element units in the groups of visual elements. For example, the chart reuse module 122 may update the visual elements in a visual element unit based on the first correlation and the target information 177, and then update visual elements within a further visual element unit based on the updated visual element in the visual element unit and the second correlation. The target infographic 172 may be generated based at least on the updating described above.

In addition, updating of a group of visual elements may affect the change of the relative positions of the group of visual element units in an available display area of the infographic, for example, due to factors, such as increase or reduction in the number of visual element units in the group of visual element units, and the like. The chart reuse module 122 may acquire first relative positions of a group of visual element units in an available display area of the original infographic 171. Based on the first relative positions and the updating of the group of visual element units, the chart reuse module 122 may determine second relative positions of the updated group of visual element units in an available display area of the target infographic 172. The target infographic 172 may be generated based on the updating of the group of visual element units and the second relative positions.

It should be appreciated that the type and format of the infographic bar chart, and the content included therein are provided merely as an example.

The infographic described herein effectively display information and data by combining data visualization and graphic design. The infographic may include, for example, a bar graph, pie chart, line chart, and the like. Although the solution of the subject matter described herein is illustrated with an example of a bar graph, it can be applied to other types of infographics.

Reference will be made to FIGS. 2-5 to describe in detail a process of deconstructing and reusing an infographic by the chart reuse model 122.

Infographic Reuse Process

Figure 2:
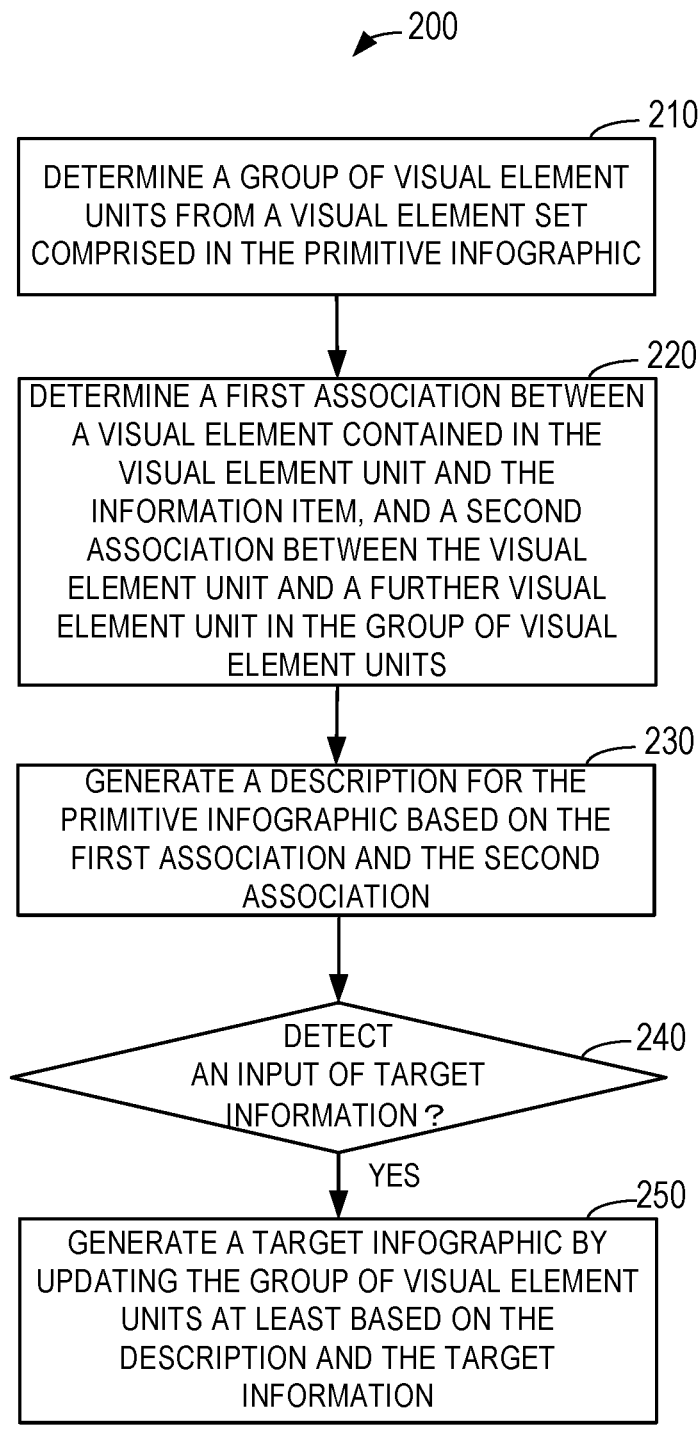
FIG. 2 illustrates a flowchart of a process in accordance with an implementation of the subject matter described herein.

FIG. 2 illustrates a flowchart of a process 200 in accordance with some implementations of the subject matter described herein. The process 200 may be implemented by the computing device 100, for example, at the chart reuse module 122 in the memory 120 of the computing device 100.

At block 210, if it is determined that an original infographic is received, the chart reuse model 122 determines a group of visual element units from a visual element set comprised in the original infographic. A visual element unit in the group of visual element units represents an information item in the original infographic.

The original infographic may include a visual element set. If the original infographic is to be deconstructed, an input at the deconstructing step is the visual element set. Visual properties of the visual elements in the visual element set, such as size, location, text, font, fill color, stroke color, and the like, may be known or identifiable.

A visual element unit may include one or more visual elements which, for example, may represent an information item of an original infographic. The original infographic may include a plurality of visual element units. The plurality of visual element units may characterize complete information represented by the original infographic.

There is a correspondence relation between a visual element unit and a further visual element unit. For example, the visual element unit and the further visual element unit may include the same number of visual elements. In another example, a visual element in the visual element unit and a further visual element unit in the further visual element unit may have the same element property, or may indicate the same semantic meaning.

In some implementations, clustering may be performed on the visual element set of the original infographic. Based on the similarities of visual elements in the visual element set, the visual element set may be divided into a plurality of visual element clusters, and the number of visual elements contained in each of the plurality of visual element clusters may be determined accordingly. The number of visual elements contained in a visual element cluster may be regarded as the size of the visual element cluster.

The size of the most frequent visual element cluster may be the number of visual element units contained in the original infographic, and an anchor visual element cluster may be determined from the visual element clusters having the size of the most frequent cluster. The visual elements in the anchor visual element cluster may act as anchor visual elements of the respective visual element units, and visual elements in non-anchor visual element clusters among the visual element clusters having the size of the most frequent cluster may be assigned to the anchor visual elements, respectively, to generate a plurality of visual element units. In the process of assigning non-anchor visual elements to the anchor visual elements so as to form respective visual element units, in the above-mentioned way, it may be determined whether the visual elements in the non-anchor visual element clusters and the anchor visual elements are located in the same visual element unit, i.e., visual elements in the same visual element unit should be closer to each other than visual elements from different visual element units.

In the process of forming visual element units, visual elements equivalent in functionality across respective visual element units may be determined to form a visual element sequence. Accompanied with assignment of a non-anchor visual element in the non-anchor visual element cluster to an anchor visual element, the remaining non-anchor visual elements not assigned in the non-anchor visual element cluster may be removed from the non-anchor visual element cluster and join in a visual element sequence. In this way, visual elements in all the visual element clusters can be categorized into respective visual element sequences.

Determination of visual element units will be described in detail, for example, through implementations as shown in FIGS. 3A-3D.

Figure 3A:
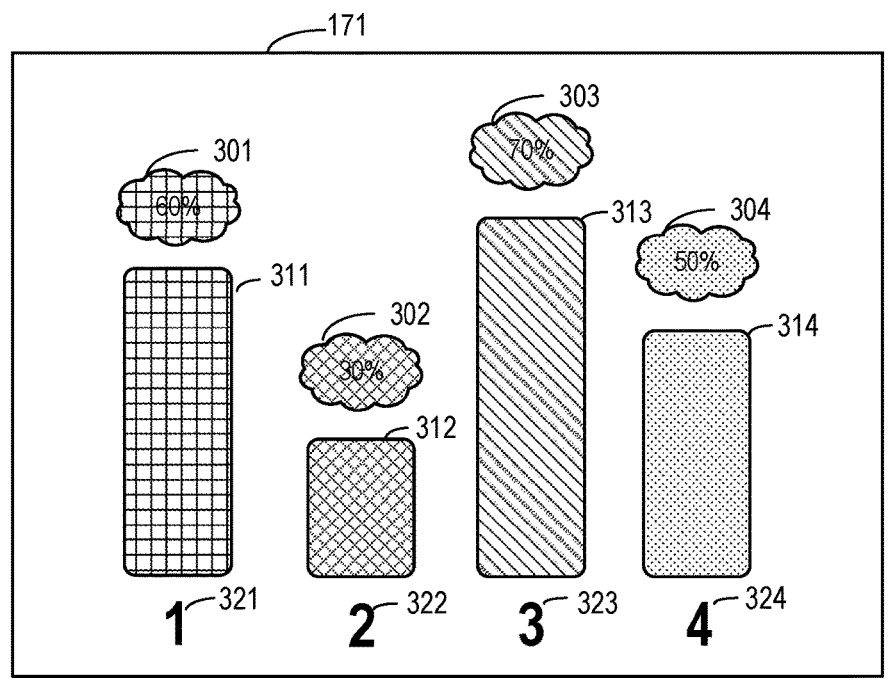
FIGS. 3A-3F illustrate schematic diagrams of a process of reusing infographics in accordance with an implementation of the subject matter described herein.

FIG. 3A illustrates an original infographic 171. As shown in FIG. 3A, the original infographic 171 may include a visual element set 301-304, 311-314 and 321-324. The visual element set 301-304, 311-314 and 321-324 may be an input in the deconstruction process of the original infographic 171.

During deconstruction of the original infographic 171, the visual element set 301-304, 311-314 and 321-324 may be divided into a plurality of visual element clusters, by determining similarities among respective visual elements in the visual element set 301-304, 311-314 and 321-324.

In some implementations, determining the similarities between visual elements, for example, may include determining whether the visual elements are consistent with each other in shape, color, text-related property, alignment, and the like. The text-related properties, for example, may include whether the visual elements contain numeral-correlation information, whether the font size, font type and the count of characters are the same, and the like.

Based on the determination of the similarities, the visual element set 301-304, 311-314, 321-324, for example, may be divided into the first visual element cluster containing visual elements 301, 302, 303 and 304, the second visual element cluster containing visual elements 311, 312, 313 and 314 and the third visual element cluster containing visual elements 321, 322, 323 and 324.

The first visual element cluster, the second visual element cluster and the third visual element cluster each include 4 visual elements. As such, the most frequent cluster size is 4 elements. From the first visual element cluster, the second visual element cluster and the third visual element cluster, a visual element cluster may be selected as an anchor visual element cluster. For example, the first visual element cluster acts as the anchor visual element cluster. The visual elements 301, 302, 303 and 304 contained in the first visual element cluster are anchor visual elements. The visual elements in the second and third visual element clusters are assigned to the respective anchor visual elements 301, 302, 303 and 304 in the first visual element cluster, so as to form visual element units, respectively.

Figure 3B:
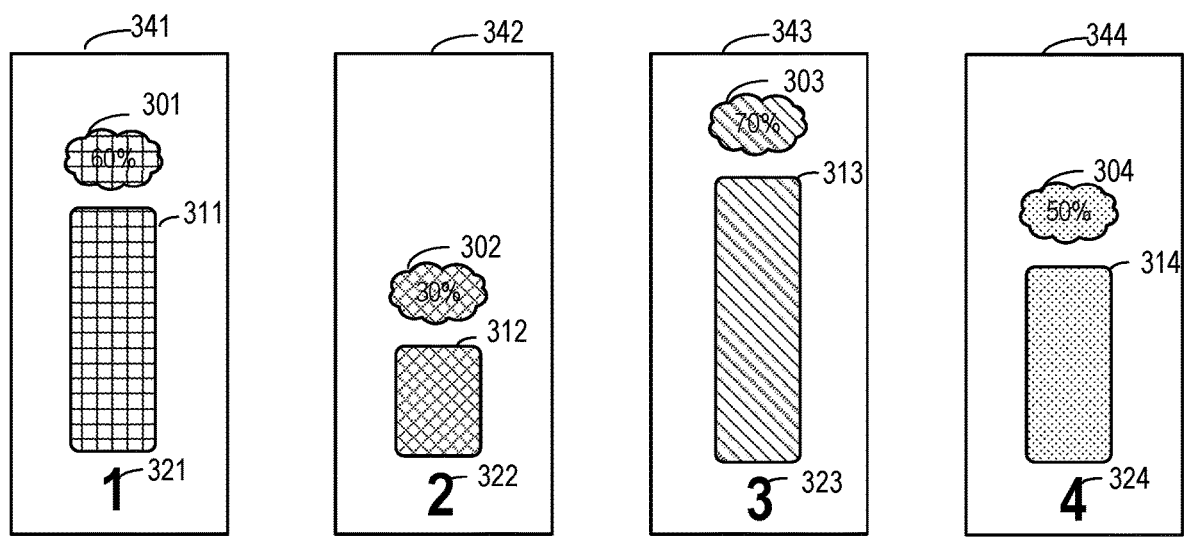

For example, in the course of assigning the non-anchor visual elements 311, 312, 313 and 314 in the second visual element cluster to the anchor visual element 301 to form a visual element unit, the non-anchor visual element 311 is closer to the anchor visual element 301 than the non-anchor visual elements 312, 313 and 314, and the non-anchor visual element 311 therefore is assigned to the anchor visual element 301. Similarly, in the course of assigning the non-anchor visual elements 321, 322, 323 and 324 in the third visual element cluster to the anchor visual element 301 to form a visual element unit, the non-anchor visual element 321 is closer to the anchor visual element 301 than the non-anchor visual elements 322, 323 and 324, and the non-anchor visual element 321 therefore is assigned to the anchor visual element 301. In this way, as shown in FIG. 3B, for example, the visual element 311 in the second visual element cluster and the visual element 321 in the third visual element cluster are assigned to the anchor visual element 301 of the first visual element cluster, so as to form a visual element unit 341. In the same way, visual element units 342, 343 and 344 may be formed accordingly.

Figure 3C:
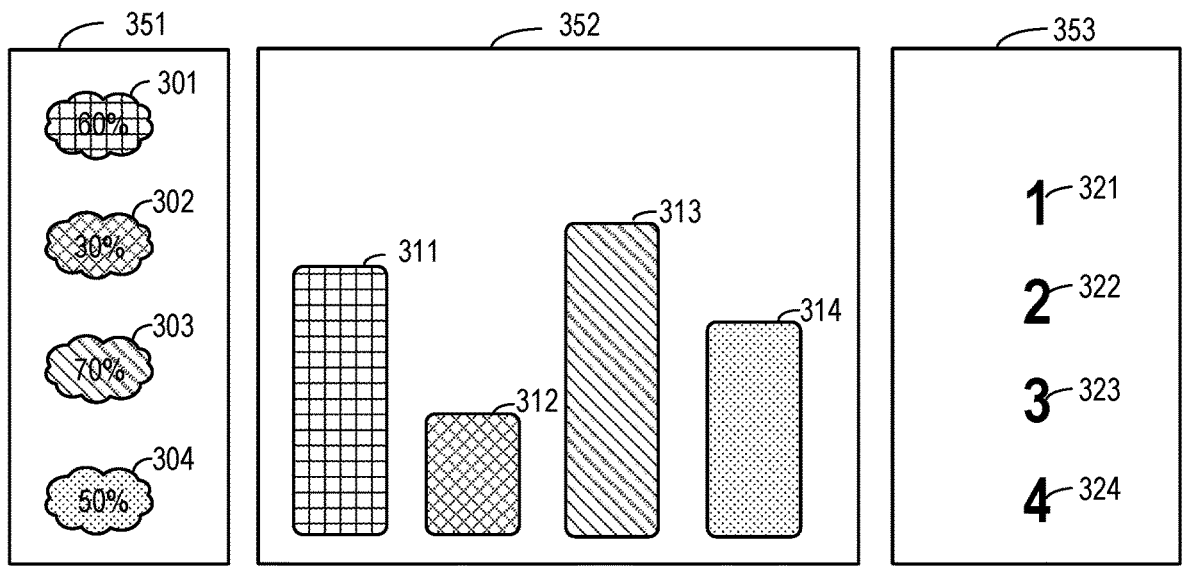

As aforementioned, visual elements in the respective visual elements may be categorized into respective visual element sequences when forming visual element units. Visual elements in the same visual element sequence may be equivalent elements in the respective visual element units. Continuing with FIG. 3A, for example, if the non-anchor visual element 311 in the second visual element cluster is assigned to the anchor visual element 301, the remaining non-anchor visual elements 312, 313 and 314 in the second visual element cluster may be categorized into a visual element sequence. Similarly, if the non-anchor visual element 312 in the second visual element cluster is assigned to the anchor visual element 302, the remaining non-anchor visual elements 311, 313 and 314 in the second visual element cluster may be categorized into the visual element sequence. In this way, the process is repeated until all the visual elements in a visual element cluster are categorized into a visual element sequence. FIG. 3C illustrates a schematic diagram of categorizing the visual element set in the original infographic 171 into visual element sequences. As shown in FIG. 3C, the visual elements 301, 302, 303 and 304 are categorized into a visual element sequence 351, the visual elements 311, 312, 313 and 314 are categorized into a visual element sequence 352, and the visual elements 321, 322, 323 and 324 are categorized into a visual element sequence 353.

Referring again to FIG. 2, at block 220, the chart reuse module 122 determines the first correlation between visual elements contained in a visual element unit in a group of visual element units and an information item, and the second correlation between the visual element unit and a further visual element unit in the group of visual element units.

In some implementations, the chart reuse module 122 may determine property information of the visual elements contained in the visual element unit, and an influence mode of a semantic change of the information item represented by the visual element unit on those visual elements. Based on the property information of the visual elements and the influence mode, the chart reuse module 122 may determine the first correlation between the visual elements contained in the visual element unit and the information item.

In some implementations, property information of visual elements, for example, may indicate property information of the visual elements per se within the unit, such as types of the visual elements (i.e., the visual elements are text or graphical elements). The property information of the visual elements, for example, may also include whether the visual elements are filled or outlined with colors, and the like.

In the visual element unit 341, property information of visual elements within the unit, for example, may include that the visual element 321 is a text element, the visual element 311 is a graphical element and filled with colors, and the visual element 301 includes both a text element and a graphical element, and is filled with colors.

In some implementations, property information of visual elements, for example, may include feature information among visual elements within a unit, such as repetitive counts of the visual elements within the unit, color consistency, alignment, even distribution, overlapping distribution, or the like.

In the visual element unit 341, the feature information among visual elements within the unit, for example, may include that respective repetitive counts of the visual elements 301, 311 and 321 are 1, and the visual elements 301 and 311 are consistent in color and center aligned.

In some implementations, the influence mode of a semantic change of an information item on visual elements may include a morphing, a movement, a change in color, a change in arrangement and combination, and the like, of the visual elements caused by the semantic change of the information item. The combination change, for example, may include a change in repetitive account, stacking manner, or the like, of a visual element within a unit.

In some implementations, some visual elements within the unit are free from the effect of a semantic change of an information item. For example, those visual elements may be unrelated to the data in the information item, but related to an entry ordinal of the data, or the name or category of the data. In this circumstance, if only the data item in the information item is changed, such type of visual elements is not varied along therewith.

In the visual element unit 341, if a data item in the information item is changed, the visual element 321 is not varied along therewith since it represents an entry ordinal of the data. The visual element 311 is expanded or shrunk in shape as the data is increased or decreased. For the visual element 301, the text element included therein is first replaced by a respective numerical value along with the data change. In addition, as the visual element 311 is expanded or shrunk in shape, the position of the visual element 301 will be moved up or down.

In some implementations, the chart reuse module 122 may determine a layout relationship between a visual element unit and a further visual element. In some implementations, the layout relationship between visual elements, for example, may include an arrangement of the visual element units and a positional relation between the visual elements. The positional relation between visual element units may include a distance between a zero line of a visual element unit and that of a further visual element unit.

The arrangement of visual element units may be a grid, for example, a layout relationship among 341, 342, 343 and 344 in the original infographic 171. Alternatively, the layout relationship among the visual element units may be a stack. In the stack layout relation, the visual element units are presented in a form of stack to emphasize a proportional relation among respective visual element units. The layout relationship among the visual element units may also be a tornado. The tornado layout may be used to emphasize a comparison relation between two visual element units. For example, the two visual element units share a common zero line but exhibit growth in opposite directions.

In some implementations, the chart reuse module 122 may determine correlation information between a visual element contained in a visual element unit and a visual element contained in a further visual element unit.

The correlation information described herein may involve feature information among equivalent visual elements in different visual element units belonging to the same visual element sequence, for example, consistency of inter-unit visual elements in geometric shape, color, size, presence, and alignment. In addition, the correlation information may further involve whether all visual element units include visual elements containing the same data.

The visual element units 341 and 342 including the same number of visual elements are used as an example. For instance, the visual element 321 in the visual element unit 341 and the visual element 322 in the visual element unit 342 are consistent in color, size and presence and aligned with each other. The visual element 311 in the visual element unit 341 and the visual element 312 in the visual element unit 342 are inconsistent in geometric shape, color and size, but consistent in presence and aligned with each other. The visual element 321 in the visual element unit 341 and the visual element 302 in the visual element unit 342 are consistent in geometric shape, size and presence, but different in color and unaligned with each other.

Based on the layout relationship and correlation information, as discussed above, the second correlation between a visual element unit and a further visual element unit can be determined.

As aforementioned, the first correlation between a visual element contained in a visual element unit in a group of visual element units and an information item, and the second correlation between the visual element unit and a further visual element unit in the group of visual element units can be determined. The first correlation and the second correlation mentioned above can be determined through a trained machine learning model.

As shown in FIG. 2, at block 230, based on the determined first correlation and the second correlation, the chart reuse module 122 generates a description for the original infographic 171. If the original infographic 171 is used as an input to the trained machine learning model, the output of the machine learning model may be predetermined tags for characterizing the first correlation and the second correlation. The description for the original infographic 171 may be generated based on these predetermined tags.

In some implementations, the predetermined tags, for example, may include <yes> and <no> types tag. For instance, such type of tags may be used to characterize features, for example, whether visual elements are consistent in shape, size or color, whether they are aligned with each other, and the like. Alternatively, the predetermined tags may be used to characterize properties of visual elements, such as <text>, <graph>, and the like.

In addition, in some implementations, the predetermined tags, for example, may include a tag characterizing an influence mode of a semantic change of the information element on a visual element. Such type of tags may include, for example, <morph>, <move>, <repeat>, <recolor>, <partition> and <fix>. For instance, in the visual element unit 341, a tag for characterizing an influence mode of a semantic change of an information item on the visual element 321 may be <fix>, a tag for characterizing an influence mode of a semantic change of an information item on the visual element 311 may be <morph>, and a tag for characterizing an influence mode of a semantic change of an information item on the visual element 301 may be <move>.

At block 240, if the chart reuse module 122 detects an input of target information to be applied to the original infographic 171, the visual element units are updated at least based on the description and the target information, to generate a target infographic.

In some implementations, the visual elements contained in a group of visual element units may be updated based on the first correlation and the target information. As discussed above, a visual element unit may represent, for example, an information item of original information in the original infographic 171. The visual element units 341, 342, 343 and 344 in FIG. 3B, for example, may represent "a business growth rate of the first sales group is 60%," "a business growth rate of the second sales group is 30%," "a business growth rate of the third sales group is 70%" and "a business growth rate of the fourth sales group is 50%."

If it is detected that the input target data include "sales of the first sales group are ¥ 1,140," "sales of the second sales group are ¥ 800," "sales of the third sales group are ¥ 990" and "sales of the fourth sales group are ¥ 600," it may be obtained from the first correlation that the visual elements 321, 322, 323 and 324 will remain unchanged in the target infographic to be generated. The visual elements 311, 312, 313 and 314 may be expanded or shrunk based on changes of data items in respective information items between the original information and the target information. The visual elements 301, 302, 303 and 304 include both graphical elements and text elements, respectively. On one hand, the text elements of the visual elements 301, 302, 303 and 304 are updated from 60%, 30%, 70% and 50% to ¥ 1,140, ¥ 800, ¥ 900 and ¥ 600. On the other hand, since the visual elements 311, 312, 313 and 314 are expanded or shrunk, the visual elements 301, 302, 303 and 304 are moved up or down along therewith.

The respective visual element units may be updated based on the target data. In addition, based on the updating of the visual elements in a visual element unit and the determined second correlation, the chart reuse module 122 may update visual elements in a further visual element unit. The updating, for example, may include adjusting alignment, recoloring, size relationships, and the like.

Figure 3D:
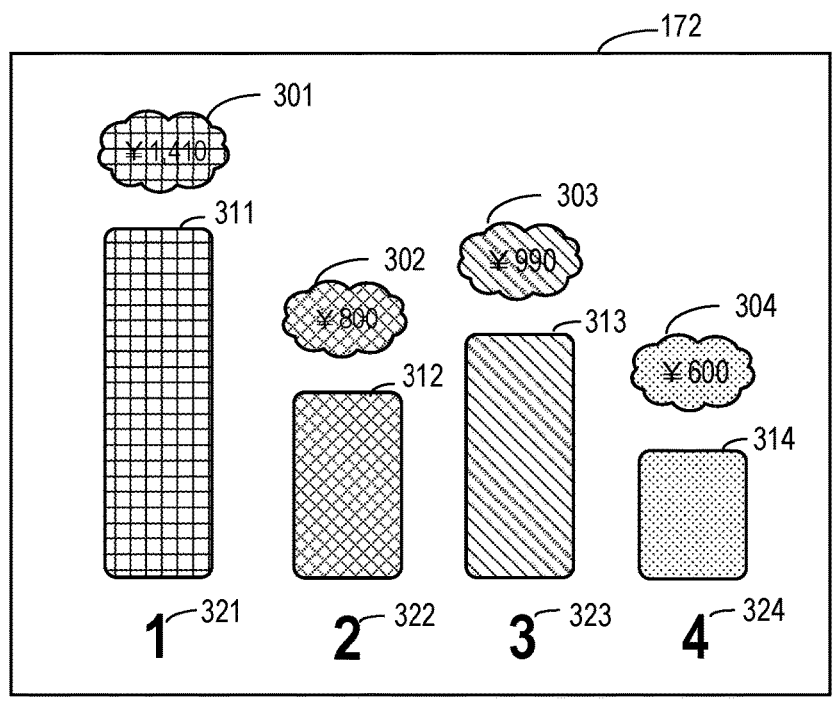
Figure 3E:
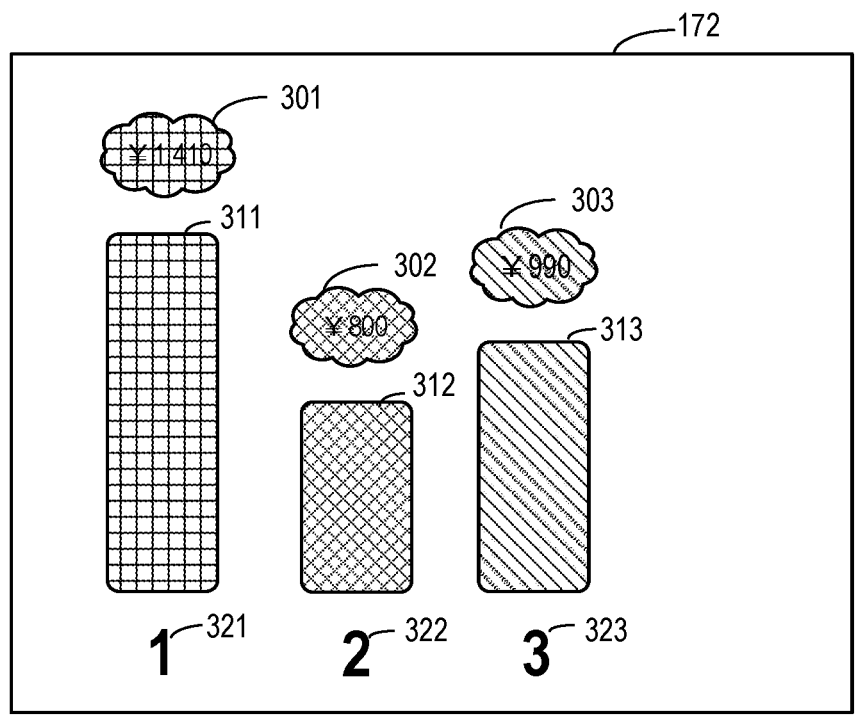

Based on the updating of the visual elements within the visual element unit and the updating of the visual elements across the visual element units, the chart reuse module 122 may generate the target infographic 172 shown in FIG. 3D.

In some implementations, in addition to the updating of the visual elements within the visual element unit and the updating of the visual elements across the visual element units, further updating may be performed for the visual effect of the aforementioned updating on the entire infographic level, so as to further optimize the rendering effect of the generated target infographic. This process may be regarded as an infographic post-processing procedure. If the number of the visual element units is increased or reduced due to the change of the number of information items of the target information and the original information, the post-processing is of vital importance.

In some implementations, the chart reuse module 122 may obtain the first relative positions of visual element units in an available display area of the original infographic. The available display area may be regarded as a canvas range where the original infographic is located. The first relative positions, for example, may be distances between reference points of respective visual element units and an edge of the available display area. Based on the updating of the visual elements within the visual element unit, the updating of the visual elements across the visual element units, and the first relative positions, the chart reuse module 122 may adjust rendering positions of a plurality of visual element units in the canvas range, and the adjusted rendering positions may be regarded as second relative positions of the visual element units in the available display area of the target infographic. As a result, the chart reuse module 122 may generate the target infographic based on the second relative positions, in addition to updating the visual elements in the visual element unit and updating the visual elements across the visual element units as mentioned above.

For example, if it is detected that the target information only includes the following information items, namely "a business growth rate of the first sales group is 60%," "a business growth rate of the second sales group is 30%" and "a business growth rate of the third sales group is 70%," then the visual element 344 in the original infographic will be removed. If the post-processing operation is not performed, the target infographic 172' generated may be the one shown in FIG. 3E. Although the target infographic 172' shown in FIG. 3E can display all target information, its presentation effect is not satisfactory. This is because there is a blank in the display position originally used for the visual element unit 344.

Figure 3F:
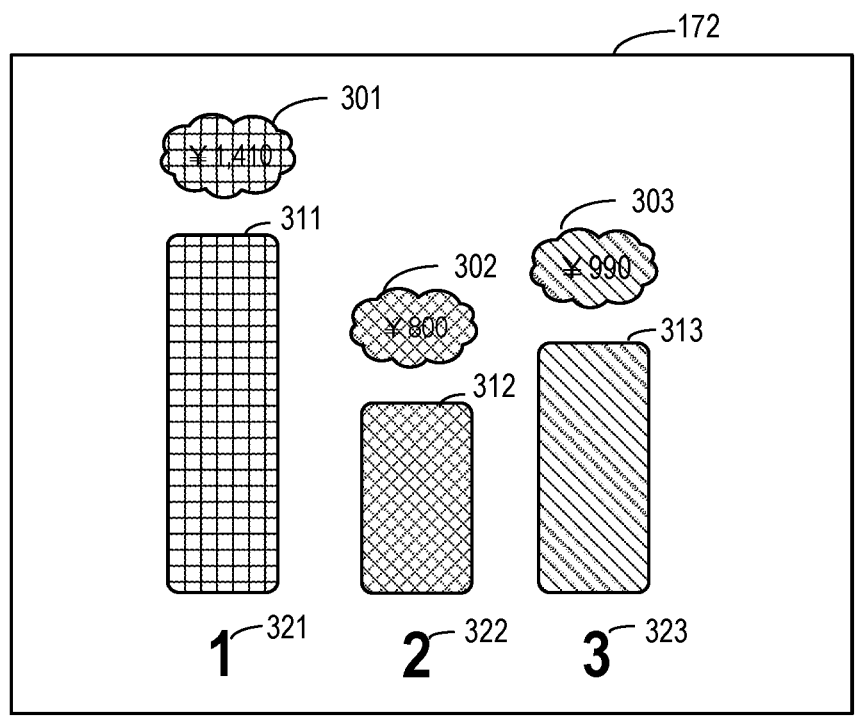

After the post-processing operation, the updated display positions of the plurality of visual element units in the available display area may be adjusted. For example, the post-processed target infographic 172" may be as shown in FIG. 3F. As compared with the target infographic 172' in FIG. 3E, the target infographic 172" shown in FIG. 3F exhibits an optimized display effect.

Reference has been made to FIGS. 3A-3F above to describe an example implementation of reuse of infographics. The process is implemented through trained machine learning models, which includes: determining visual element units in the original infographic, determining a correlation within a visual element unit and a correlation between visual element units, generating a description, and generating the target infographic based on the target information and the description. For example, a decision tree-based a regression model may be employed to divide the visual elements in the original infographic into a plurality of visual element clusters; a Hungarian algorithm may be leveraged to assign visual elements in a visual element cluster to a visual element unit and a visual element sequence; and a multi-tag prediction model may be used to generate the description for the original infographic.

The machine learning models may be determined based on historical training samples of a plurality of infographics. The machine learning models may be included in the computing device 100 in FIG. 1. More specifically, the machine learning models may be included in the chart reuse model 122 shown in FIG. 1.

Example Implementation of Reuse of Infographics

For detailed illustration of the implementation mode of the subject matter described herein, reference will be made to FIGS. 4A-4E to describe a process of reuse of infographics in accordance with a further implementation.

Figure 4A:
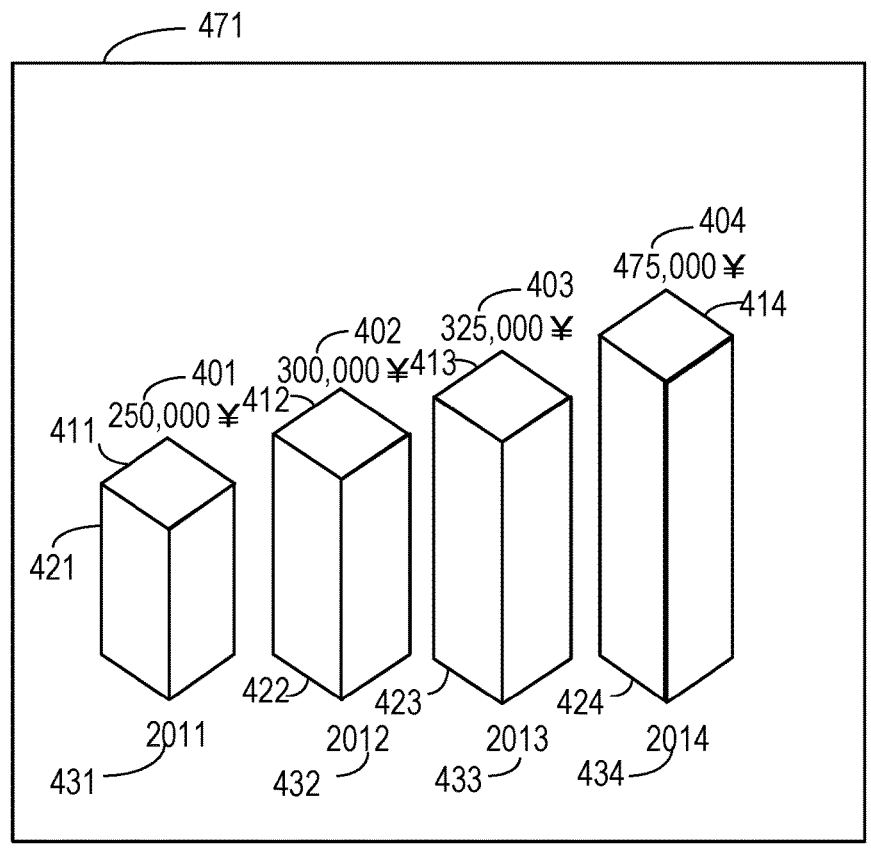
FIGS. 4A-4E illustrate schematic diagrams of a process of reusing infographics in accordance with a further implementation of the subject matter described herein.

As shown in FIG. 4A, an original infographic 471 may be input into the chart reuse module 122 in FIG. 1. The infographic module 122 may determine a visual element set (i.e., visual elements 401-404, 411-414, 421-424 and 431-434) included in the original infographic 471.

The chart reuse module 122 may determine a plurality of visual element units from the visual elements 401-404, 411-414, 421-424 and 431-434 included in the original infographic 471.

In the process of determining visual element units, the chart reuse module 122 may divide the visual element set 401-401, 411-414, 421-424 and 431-434 into a plurality of visual element clusters, by determining similarities between respective visual elements in the visual element set 401-404, 411-414, 421-424 and 431-434.

For example, the visual element set 401-401, 411-414, 421-424 and 431-434 may be divided into the first visual element cluster containing visual elements 411-414, the second visual element cluster containing visual elements 411-414, the third visual element cluster containing visual elements 421-424, and the fourth visual element cluster containing visual elements 431-434.

The first visual element cluster, the second visual element cluster, the third visual element cluster and the fourth visual element cluster each include 4 visual elements. The most frequency cluster size is 4 elements accordingly. From the first visual element cluster, the second visual element cluster, the third visual element cluster and the fourth visual element cluster, a visual element cluster may be selected as an anchor visual element cluster. For example, the first visual element cluster may be used as the anchor visual element cluster. The visual elements 401, 402, 403 and 404 contained in the first visual element cluster are anchor visual elements. The visual elements in the second visual element cluster, the third visual element cluster and the fourth visual element cluster may be assigned to the respective anchor visual elements 301, 302, 303 and 304 in the first visual element cluster to form visual element units, respectively.

Figure 4B:
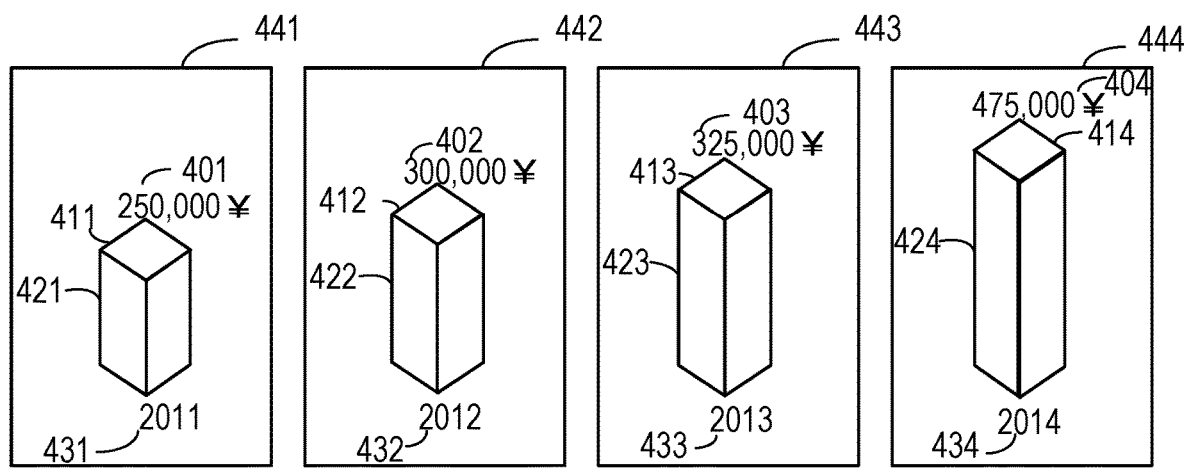

As discussed above, based on respective distances between non-anchor visual elements in the respective visual element clusters and an anchor visual element, the chart reuse model 122 may determine which specific anchor visual elements are to be assigned to the anchor visual element to form a visual element unit. When assigning the non-anchor visual elements 411, 412, 413 and 414 in the second visual element cluster to the anchor visual element 401 to form a visual element unit, the non-anchor visual element 411 is closer to the visual element 401 than the non-anchor visual elements 412, 413 and 414, and the non-anchor visual element 411 therefore is assigned to the anchor visual element 401. In this way, as shown in FIG. 4B, the visual element 411 in the second visual element cluster, the visual element 421 in the third visual element cluster, and the visual element 431 in the fourth visual element cluster are assigned to the anchor visual element 401 in the first visual element cluster, to form a visual element unit 441. Likewise, visual element units 442, 443 and 444 can be formed accordingly.

When determining visual element units, the chart reuse module 122 may further categorize visual elements in the respective visual element clusters into respective visual element sequences. In FIG. 4A, for example, if the non-anchor visual element 411 in the second visual element cluster is assigned to the anchor visual element 401, the remaining non-anchor visual elements 412, 413 and 414 in the second visual element cluster may be categorized into a visual element sequence. Similarly, if the non-anchor visual element 412 in the second visual element cluster is assigned to the anchor visual element 402, the remaining non-anchor visual elements 411, 413 and 414 in the second visual element cluster may be categorized in the visual element sequence. In the way, the process is repeated until visual elements in a visual element cluster are all categorized into respective visual element sequences.

Figure 4C:
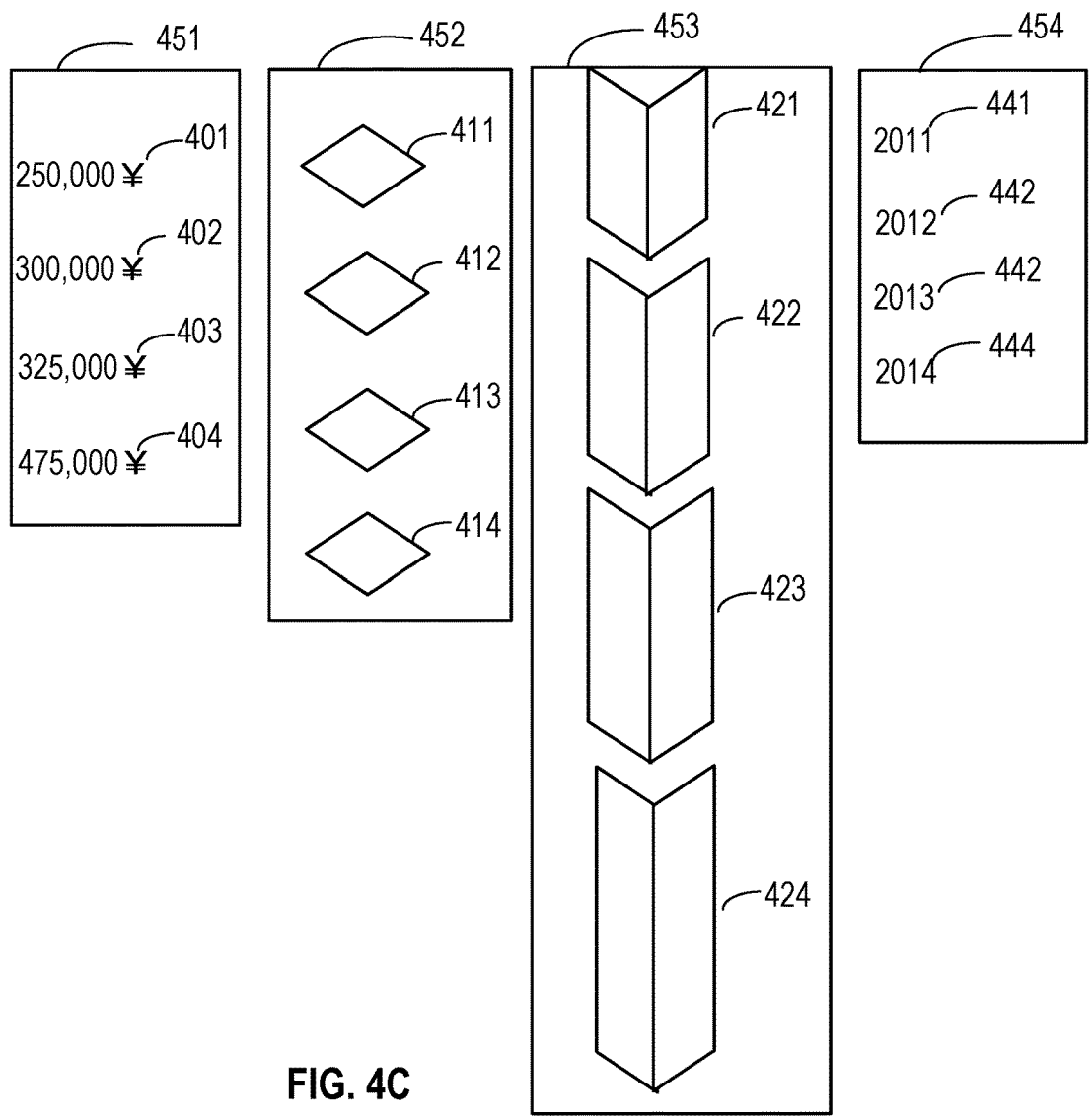

FIG. 4C illustrates a schematic diagram of categorizing the visual element set in the original infographic 471 into the respective visual element sequences. As shown in FIG. 4C, the visual elements 401, 402, 403 and 404 are categorized into a visual element sequence 451, the visual elements 411, 412, 413 and 414 are categorized into a visual element sequence 452, the visual elements 421, 422, 423 and 424 are categorized into a visual element sequence 453, and the visual elements 431, 432, 433 and 434 are categorized into a visual element sequence 454.

The chart reuse module 122 may determine the first correlation between a visual element contained in a visual element unit in the plurality of visual element units and an information item in the original infographic, and the second correlation between the visual element unit and a further visual element unit.

In some implementations, the chart reuse module 122 may determine property information of the visual element in the visual element unit. For instance, as shown in FIG. 4B, in the visual element unit 441, the property information of the visual element within the unit may include: the visual elements 401 and 441 are text elements, and visual elements 411 and 421 are graphical elements without fill color.

In some implementations, the chart reuse module 122 may further determine feature information among visual elements in a visual element unit. The visual element unit 441 is still used as an example. In the visual element unit 441, the visual elements 401, 411, 421 and 431 appear only once, and those elements are centered on each other.

Moreover, in some implementations, the chart reuse module 122 may further determine an influence mode of a semantic change of an information item on visual elements within a unit. In the visual element unit 441, visual element 431 whose property information is a text element is a data item indicative of year in the information item. If the data item indicative of year in the information item is changed, the text of the visual element 431 is to be replaced. However, the position of the visual element 431 will not vary with other visual elements within the unit. The visual element 411 is expanded or shrunk in shape when the data item in the information item is increased or reduced. The visual element 421 is moved up or down when the visual element 411 is expanded or shrunk in shape. As far as the visual element 421 is concerned, due to the property of its text element, the visual element 421 vary with the data item in the information item, on one hand; and it shifts as the visual element 421 is moved up or down, on the other hand.

Based on the determined property information of the visual element, the feature information among visual elements in the visual element unit, and the influence mode of the semantic change of the information item on the visual element within the unit, the chart reuse module 122 may determine the first correlation between the visual element contained in the visual element unit in the visual element units and the information item in the original infographic.

In order to determine the second correlation between a visual element unit and a further visual element unit, in some implementations, the chart reuse module 122 may determine a layout relationship between the visual element unit and the further visual element unit. In the original infographic 471 shown in FIG. 4A, the layout relationship between the visual element units is a grid. In some implementations, the chart reuse module 122 may also determine correlation information between the visual element contained in a visual element unit and a visual element contained in a further visual element unit.

The visual element units 441 and 442 include the same number of visual elements. For example, the visual element 431 in the visual element unit 441 and the visual element 432 in the visual element unit 442 are consistent in color, size and presence and aligned with each other. The visual element 421 in the visual element unit 441 and the visual element 422 in the visual element unit 442 are inconsistent in size, but consistent in geometric shape and presence and aligned with each other at bottom. The visual element 411 in the visual element unit 441 and the visual element 412 in the visual element unit 442 are consistent in geometric shape, size, color and presence and unaligned with each other. The visual element 401 in the visual element unit 441 and the visual element 402 in the visual element unit 442 are consistent in presence and unaligned with each other. Based on the layout relationship and correlation information mentioned above, the second correlation between every two of the visual element units in the original infographic 471 may be determined.

Based on the determined first correlation and the second correlation, the chart reuse module 122 may generate a description for the original infographic 471 by obtaining predetermined tags for characterizing the first correlation and the second correlation. For example, the predetermined tags may include <yes> and <no> for characterizing features, for example, whether visual elements are consistent in shape, size or color, whether they are aligned with each other, and the like. The predetermined tags may further include <text>, <graph> for characterizing properties of visual elements, and tags for characterizing an influence mode of a semantic change of an information item on visual elements.

For example, for the visual element 401 in the visual element unit 441, its description may include information, such as property information <text>, alignment with visual elements 411, 421, 431<yes>, alignment with visual elements 402, 403, 404<no>, presence consistency with visual elements 402, 403, 404<yes>, the influence mode of the semantic change of the information item on the visual element 401<move>, and the like.

Based on the determined first correlation and the second correlation, the chart reuse module 122 may generate corresponding description for each visual element in the original infographic 471, to obtain description for the original infographic 471.

In some implementations, the chart reuse module 122 may detect an input of new target information to be applied to the original infographic 471. For example, the new target information may be "sales completion rates of the department from 2015 to 2019 are 90%, 60%, 80%, 75% and 45%, respectively." Based on the input target information and the obtained description for the original infographic 471, the chart reuse module 122 may generate a new target infographic.

In some implementations, the chart reuse module 122 may update visual elements within a visual element unit, based on input target information and the first correlation between the visual element unit and an information item, and update a visual element in a further visual element unit with reference to the visual element unit, based on the second correlation between the visual element units.

For example, the original information item represented by the visual element unit 441 is that the sales of the department in 2011 are ¥ 250,000. After the new target information is input, the visual element unit 441 represents that the sales completion rate of the department in 2015 is 90%.

For example, based on the first correlation, the visual element 431 in the visual element unit 441 is a text element, the influence mode of the information item is "fix", thus the text of the visual element 431 is changed from "2011" to "2015" and the position thereof remains unchanged in the visual element unit 441.

The visual element 421 in the visual element unit 441 is a graphical element, the influence mode of the information item is "morph", then the visual element 421 is expanded since the data in the information item is changed from "250,000" to "90%." The visual element 411 in the visual element unit 441 is a graphical element, and the influence mode of the information item is "move," then the visual element 411 is moved up as the visual element 411 is expanded. The visual element 401 in the visual element unit 441 is a text element, the influence mode of the information item is "move," and the visual element 401 therefore is moved up as the visual element 441 is moved up.

Similarly, the visual elements in the visual element units 442, 443 and 444 may also be updated based on the new target information and the first correlation. Moreover, respective visual elements may be further updated based on the second correlation and the respective visual element units updated based on the first correlation. For example, the alignment relation and the size relation of visual elements across respective visual element units may be adjusted based on the second correlation.

Figure 4D:
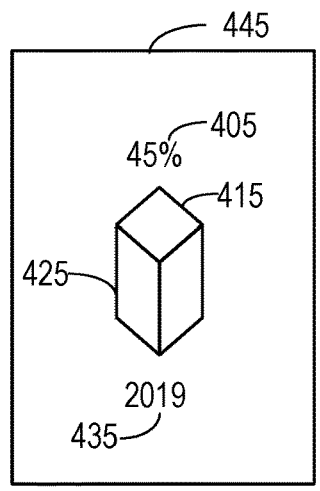

In this implementation, since the number of information items included in the new target information is changed as compared with the information items of the original information (i.e., the number of information items included in the new target information is increased), a visual element unit will be added to the newly generated target infographic. In this scenario, a new visual element unit may be generated based on the first correlation and the newly added information item. As shown in FIG. 4D, the newly generated visual element unit 445 may include visual elements 405, 415, 425 and 435. The newly generated visual element unit may be further adjusted based on the correlation information among the visual elements in the respective visual element units having the second correlation, that is, the consistency of visual elements in presence, shape, size, alignment, color, and the like.

Figure 4E:
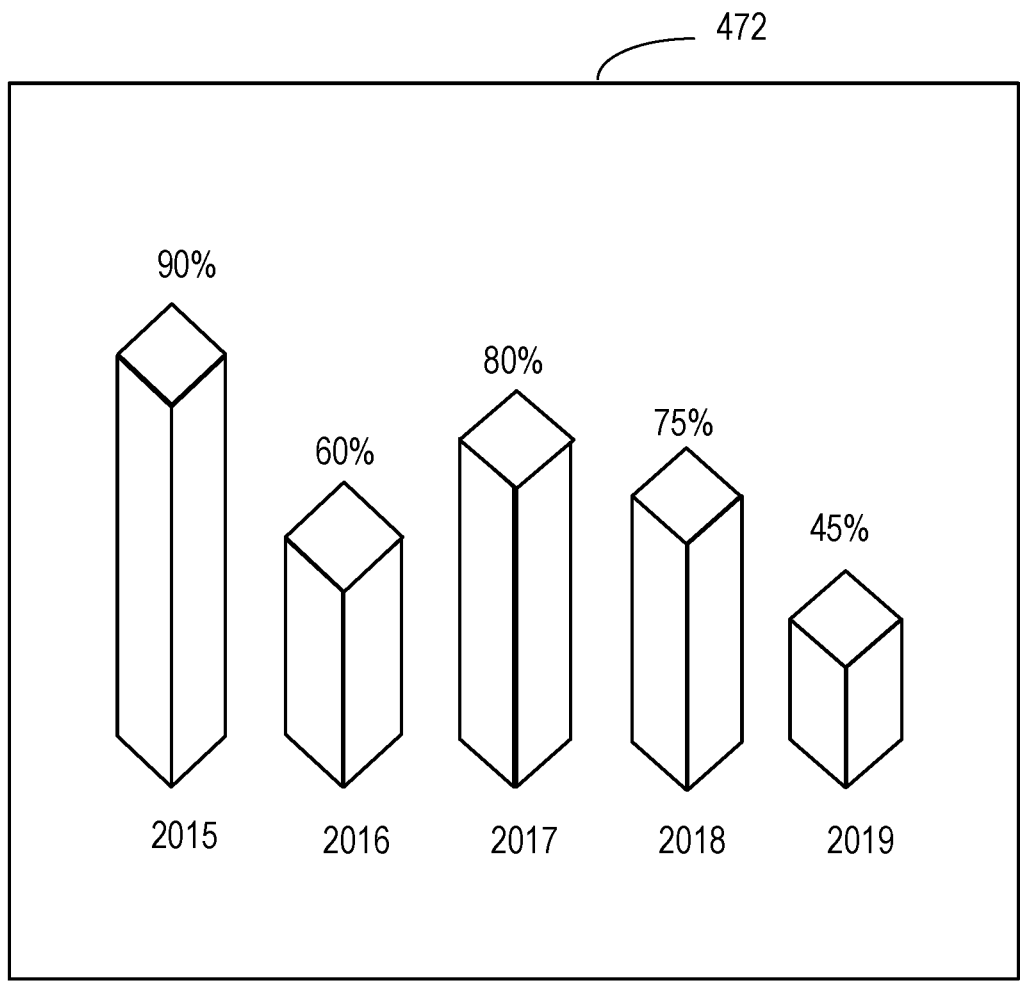

In some implementations, the chart reuse module 122 may further post-process infographics. The chart reuse module 122 may obtain the first relative positions of the visual element units 441-444 in the available display area of the original infographic. The available display area may be regarded as a canvas range where the original infographic is located. The first relative positions, for example, may be distances from reference points of the respective visual element units to an edge of the display area. Based on the respective updated visual elements 441-445 and the first relative positions, the chart reuse module 122 may adjust the rendering positions of the current plurality of visual element units 441-445 in the canvas range, the adjusted rendering positions may be regarded as the second relative positions of the visual element units 441-445 in an available display area of a target infographic to be generated. Therefore, as shown in FIG. 4E, the chart reuse module 122 may generate the target infographic 472 based on the post-processing.

Example Implementations

Some example implementations of the subject matter described herein will be given below.

In a first aspect, there is provided an electronic device. The electronic device comprises: a processing unit; and a memory coupled to the processing unit and having instructions stored thereon, the instructions, when executed by the processing unit, causing the device to perform acts of: in accordance with a determination that an original infographic is received, determining a group of visual element units from a visual element set comprised in the original infographic, a visual element unit in the group of visual element units representing an information item in the original infographic; determining a first correlation between a visual element contained in the visual element unit and the information item, and a second correlation between the visual element unit and a further visual element unit in the group of visual element units; generating a description for the original infographic based on the first correlation and the second correlation; and in response to detecting an input of target information, generating a target infographic by updating the group of visual element units at least based on the description and the target information.

In some implementations, determining the group of visual element units comprises: dividing the visual element set into a set of visual element clusters based on similarities of visual elements in the visual element set; determining the number of visual elements contained in respective visual element clusters in the set of visual element clusters; determining, based on the number, an anchor visual element cluster from the set of visual element clusters; and determining the group of visual element units based on the anchor visual element cluster.

In some implementations, determining the anchor visual element cluster comprises: determining, based on the number, respective cluster sizes of the set of visual element clusters; and in accordance with a determination that a first cluster size of the cluster sizes exceeds a threshold size, determining the anchor visual element cluster from at least one visual element cluster having the first cluster size in the set of visual element clusters.

In some implementations, determining the group of visual element units based on the anchor visual element cluster comprises: determining visual elements contained in the anchor visual element cluster as anchor visual elements; assigning non-anchor visual elements in a non-anchor visual element cluster to the anchor visual elements, the non-anchor visual element clusters having a same cluster size as the anchor visual element cluster; and determining the group of visual element units based on the anchor visual elements and the non-anchor visual elements assigned to the anchor visual elements.

In some implementations, determining the first correlation comprises: determining property information of the visual element contained in the visual element unit; determining an influence mode of a semantic change of the information item on the visual element contained in the visual element unit; and determining the first correlation based on the property information and the influence mode.

In some implementations, the influence mode comprises at least one of: causing a morphing of the visual element, causing a movement of the visual element, failing to cause a change in the visual element, causing a change of the visual element in color, and causing a change of the visual element in arrangement and combination.

In some implementations, determining the second correlation comprises: determining a layout relationship between the visual element unit and the further visual element unit; determining correlation information between the visual element contained in the visual element unit and a visual element contained in the further visual element unit; and determining the second correlation based on the layout relationship and the correlation information.

In some implementations, generating the description comprises: obtaining predetermined tags for characterizing the first correlation and the second correlation; and generating the description based on the tags.

In some implementations, generating the target infographic comprises: updating the visual element contained in the visual element unit based on the first correlation and the target information; updating, based on the updating of the visual element and the second correlation, a visual element contained in the further visual element unit; and generating the target infographic at least based on the updated visual element contained in the visual element unit and the updated visual element contained in the further visual element unit.

In some implementations, generating the target infographic at least based on the updated visual elements contained in the visual element unit and the updated visual element contained in the further visual element unit comprises: obtaining first relative positions of the group of visual element units in an available display area of the original infographic; determining second relative positions of the group of visual element units in an available display area of the target infographic based on the updated visual element contained in the visual element unit, the updated visual element contained in the further visual element unit and the first relative positions; and generating the target infographic based on the second relative positions, the updated visual element contained in the visual element unit and the updated visual element contained in the further visual element unit.

In another aspect, the subject matter described herein provides a computer-implemented method. The method comprises: in accordance with a determination that an original infographic is received, determining a group of visual element units from a visual element set comprised in the original infographic, a visual element unit in the group of visual element units representing an information item in the original infographic; determining a first correlation between a visual element contained in the visual element unit and the information item, and a second correlation between the visual element unit and a further visual element unit in the group of visual element units; generating a description for the original infographic based on the first correlation and the second correlation; and in response to detecting an input of target information, generating a target infographic by updating the group of visual element units at least based on the description and the target information.

In some implementations, determining the group of visual element units comprises: dividing the visual element set into a set of visual element clusters based on similarities of visual elements in the visual element set; determining the number of visual elements contained in respective visual element clusters in the set of visual element clusters; determining, based on the number, an anchor visual element cluster from the set of visual element clusters; and determining the group of visual element units based on the anchor visual element cluster.

In some implementations, determining the anchor visual element cluster comprises: determining, based on the number, respective cluster sizes of the set of visual element clusters; and in accordance with a determination that a first cluster size of the cluster sizes exceeds a threshold size, determining the anchor visual element cluster from at least one visual element cluster having the first cluster size in the set of visual element clusters.

In some implementations, determining the group of visual element units based on the anchor visual element cluster comprises: determining visual elements contained in the anchor visual element cluster as anchor visual elements; assigning non-anchor visual elements in non-anchor visual element clusters to the anchor visual elements, the non-anchor visual element clusters having a same cluster size as the anchor visual element cluster; and determining the group of visual element units based on the anchor visual elements and the non-anchor visual elements assigned to the anchor visual elements.

In some implementations, determining the first correlation comprises: determining property information of the visual elements contained in the visual element unit; determining an influence mode of a semantic change of the information item on the visual element contained in the visual element unit; and determining the first correlation based on the property information and the influence mode.

In some implementations, the influence mode comprises at least one of: causing a morphing of the visual element, causing a movement of the visual element, failing to cause a change in the visual element, causing a change of the visual element in color, and causing a change of the visual element in arrangement and combination.

In some implementations, determining the second correlation comprises: determining a layout relationship between the visual element unit and the further visual element unit; determining correlation information between the visual element contained in the visual element unit and a visual element contained in the further visual element unit; and determining the second correlation based on the layout relationship and the correlation information.

In some implementations, generating the description comprises: obtaining predetermined tags for characterizing the first correlation and the second correlation; and generating the description based on the tags.

In some implementations, generating the target infographic comprises: updating the visual element contained in the visual element unit based on the first correlation and the target information; updating, based on the updating of the visual element and the second correlation, a visual element contained in the further visual element unit; and generating the target infographic at least based on the updated visual element contained in the visual element unit and the updated visual element contained in the further visual element unit.

In some implementations, generating the target infographic at least based on the updated visual element contained in the visual element unit and the updated visual element contained in the further visual element unit, comprises: obtaining first relative positions of the group of visual element units in an available display area of the original infographic; determining second relative positions of the group of visual element units in an available display area of the target infographic based on the updated visual element contained in the visual element unit, the updated visual element contained in the further visual element unit and the first relative positions; and generating the target infographic based on the second relative positions, the updated visual element contained in the visual element unit and the updated visual element contained in the further visual element unit.

In a further aspect, the subject matter described herein provides a computer program product tangibly stored on a non-transient computer storage medium and having machine executable instructions which, when executed by a device, cause the device to: in accordance with a determination that an original infographic is received, determine a group of visual element units from a visual element set comprised in the original infographic, a visual element unit in the group of visual element units representing an information item in the original infographic; determine a first correlation between a visual element contained in the visual element unit and the information item, and a second correlation between the visual element unit and a further visual element unit in the group of visual element units; generate a description for the original infographic based on the first correlation and the second correlation; and in response to detecting an input of target information, update the group of visual element units at least based on the description and the target information, to generate a target infographic.

In some implementations, the machine executable instructions, when executed by a device, cause the device to: divide the visual element set into a set of visual element clusters based on similarities of visual elements in the visual element set; determine the number of visual elements contained in respective visual element clusters in the set of visual element clusters; determine, based on the number, an anchor visual element cluster from the set of visual element clusters; and determine the group of visual element units based on the anchor visual element cluster.

In some implementations, the machine executable instructions, when executed by a device, cause the device to: determine, based on the number, respective cluster sizes of the set of visual element clusters; and in accordance with a determination that a first cluster size of the cluster sizes exceeds a threshold size, determine the anchor visual element cluster from at least one visual element cluster having the first cluster size in the set of visual element clusters.

In some implementations, the machine executable instructions, when executed by a device, cause the device to: determine visual elements contained in the anchor visual element cluster as anchor visual elements; assign non-anchor visual elements in a non-anchor visual element cluster to the anchor visual elements, the non-anchor visual element cluster having a same cluster size as the anchor visual element cluster; and determine the group of visual element units based on the anchor visual elements and the non-anchor visual elements assigned to the anchor visual elements.

In some implementations, the machine executable instructions, when executed by a device, cause the device to: determine property information of the visual element contained in the visual element unit; determine an influence mode of a semantic change of the information item on the visual element contained in the visual element unit; and determine the first correlation based on the property information and the influence mode.

In some implementations, the influence mode comprises at least one of: causing a morphing of the visual element, causing a movement of the visual element, failing to cause a change in the visual element, causing a change of the visual element in color, and causing a change of the visual element in arrangement and combination.

In some implementations, the machine executable instructions, when executed by a device, cause the device to: determine a layout relationship between the visual element unit and the further visual element unit; determine correlation information between the visual element contained in the visual element unit and a visual element contained in the further visual element unit; and determine the second correlation based on the layout relationship and the correlation information.

In some implementations, the machine executable instructions, when executed by a device, cause the device to: obtain predetermined tags for characterizing the first correlation and the second correlation; and generate the description based on the tags.

In some implementations, the machine executable instructions, when executed by a device, cause the device to: update the visual element contained in the visual element unit based on the first correlation and the target information; update, based on the updating of the visual element and the second correlation, a visual element contained in the further visual element unit; and generate the target infographic at least based on the updated visual element contained in the visual element unit and the updated visual element contained in the further visual element unit.

In some implementations, the machine executable instructions, when executed by a device, cause the device to: obtain first relative positions of the group of visual element units in an available display area of the original infographic; determine second relative positions of the group of visual element units in an available display area of the target infographic based on the updated visual element contained in the visual element unit, the updated visual element contained in the further visual element unit and the first relative positions; and generate the target infographic based on the second relative positions, the updated visual element contained in the visual element unit and the updated visual element contained in the further visual element unit.

In yet another aspect, the subject matter described herein provides a computer readable medium which stores thereon machine executable instructions which, when executed by a device, causes the device to perform the method in accordance with the first aspect.

The functions described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), and the like.

Program code for carrying out methods of the subject matter described herein may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may be executed entirely on a machine, partly on the machine, executed as a stand-alone software package, partly on the machine and partly on a remote machine or entirely on the remote machine or server.

In the context of the subject matter described herein, a machine readable medium may be any tangible medium that may contain, or store a program for use by or in connection with an instruction execution system, apparatus, or device. The machine readable medium may be a machine readable signal medium or a machine readable storage medium. A machine readable medium may include but is not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular implementations. Certain features that are described in the context of separate implementations may also be implemented in combination in a single implementation. Conversely, various features that are described in the context of a single implementation may also be implemented in various implementations separately or in any suitable sub-combination.

Although the subject matter has been described in language specific to structural features and/or methodological acts, it is to be appreciated that the subject matter specified in the appended claims is not necessarily limited to the specific features or acts described above. Rather, the specific features and acts described above are disclosed as example forms of implementing the claims.

The invention claimed is:

1. An electronic device, comprising:
a processing unit; and
a memory coupled to the processing unit and having instructions stored thereon, the instructions, when executed by the processing unit, causing the device to perform acts of:
   in accordance with a determination that an original infographic is received, determining a group of visual element units from a visual element set comprised in the original infographic, a visual element unit in the group of visual element units representing an information item in the original infographic;
   determining a first correlation between a visual element contained in the visual element unit and the information item by determining property information and an influence mode of semantic changes on the visual element, and determining a second correlation between the visual element unit and a further visual element unit in the group of visual element units by determining layout relationships and correlation information between visual elements;
   generating a description for the original infographic by obtaining predetermined tags through a trained multi-tag prediction model to characterize the first correlation and the second correlation; and
   in accordance with a determination that an input of target information is detected, generating a target infographic by:
      updating the visual element contained in the visual element unit based on the first correlation and the target information;
      updating visual elements in the further visual element unit based on the second correlation and the updated visual element; and
      generating the target infographic based on the updated visual elements and their relative positions in an available display area.

2. The device of claim 1, wherein determining the group of visual element units comprises:
dividing the visual element set into a set of visual element clusters based on similarities of visual elements in the visual element set;
determining a number of visual elements contained in respective visual element clusters in the set of visual element clusters;
determining, based on the number, an anchor visual element cluster from the set of visual element clusters; and
determining the group of visual element units based on the anchor visual element cluster.

3. The device of claim 2, wherein determining the anchor visual element cluster comprises:
determining, based on the number, respective cluster sizes of the set of visual element clusters; and
in accordance with a determination that a first cluster size of the respective cluster sizes exceeds a threshold size, determining the anchor visual element cluster from at least one visual element cluster having the first cluster size in the set of visual element clusters.

4. The device of claim 2, wherein determining the group of visual element units based on the anchor visual element cluster comprises:

determining visual elements contained in the anchor visual element cluster as anchor visual elements;

assigning non-anchor visual elements in a non-anchor visual element cluster to the anchor visual elements, the non-anchor visual element cluster having a same cluster size as the anchor visual element cluster; and determining the group of visual element units based on the anchor visual elements and the non-anchor visual elements assigned to the anchor visual elements.

5. The device of claim 1, wherein determining the first correlation comprises:

determining property information of the visual element contained in the visual element unit;

determining an influence mode of a semantic change of the information item on the visual element contained in the visual element unit; and determining the first correlation based on the property information and the influence mode.

6. The device of claim 5, wherein the influence mode comprises at least one of:

causing a morphing of the visual element, causing a movement of the visual element, failing to cause a change in the visual element, causing a change of the visual element in color, and causing a change of the visual element in arrangement and combination.

7. The device of claim 1, wherein determining the second correlation comprises:

determining a layout relationship between the visual element unit and the further visual element unit;

determining correlation information between the visual element contained in the visual element unit and a visual element contained in the further visual element unit; and determining the second correlation based on the layout relationship and the correlation information.

8. The device of claim 1, wherein generating the description comprises:

obtaining predetermined tags for characterizing the first correlation and the second correlation; and generating the description based on the predetermined tags.

9. The device of claim 1, wherein generating the target infographic at least based on the updated visual element contained in the visual element unit and the updated visual element contained in the further visual element unit comprises:

obtaining first relative positions of the group of visual element units in an available display area of the original infographic;

determining second relative positions of the group of visual element units in an available display area of the target infographic based on the updated visual element contained in the visual element unit, the updated visual element contained in the further visual element unit and the first relative positions; and generating the target infographic based on the second relative positions, the updated visual element contained in the visual element unit and the updated visual element contained in the further visual element unit.

10. A computer-implemented method, comprising:

in accordance with a determination that an original infographic is received, determining a group of visual element units from a visual element set comprised in the original infographic, a visual element unit in the group of visual element units representing an information item in the original infographic;

determining a first correlation between a visual element contained in the visual element unit and the information item by determining property information and an influence mode of semantic changes on the visual element, and determining a second correlation between the visual element unit and a further visual element unit in the group of visual element units;

generating a description for the original infographic by obtaining predetermined tags through a trained multi-tag prediction model to characterize the first correlation and the second correlation; and in accordance with a determination that an input of target information is detected, generating a target infographic by:

updating the visual element contained in the visual element unit based on the first correlation and the target information;

updating visual elements in the further visual element unit based on the second correlation and the updated visual element; and generating the target infographic based on the updated visual elements and their relative positions in an available display area.

11. The method of claim 10, wherein determining the group of visual element units comprises:

dividing the visual element set into a set of visual element clusters based on similarities of visual elements in the visual element set;

determining a number of visual elements contained in respective visual element clusters in the set of visual element clusters;

determining, based on the number, an anchor visual element cluster from the set of visual element clusters; and determining the group of visual element units based on the anchor visual element cluster.

12. The method of claim 11, wherein determining the anchor visual element cluster comprises:

determining, based on the number, respective cluster sizes of the set of visual element clusters; and in accordance with a determination that a first cluster size of the respective cluster sizes exceeds a threshold size, determining the anchor visual element cluster from at least one visual element cluster having the first cluster size in the set of visual element clusters.

13. The method of claim 11, wherein determining the group of visual element units based on the anchor visual element cluster comprises:

determining visual elements contained in the anchor visual element cluster as anchor visual elements;

assigning non-anchor visual elements in a non-anchor visual element cluster to the anchor visual elements, the non-anchor visual element cluster having a same cluster size as the anchor visual element cluster; and determining the group of visual element units based on the anchor visual elements and the non-anchor visual elements assigned to the anchor visual elements.

14. The method of claim 13, wherein determining the first correlation comprises:

determining property information of the visual element contained in the visual element unit;

determining an influence mode of a semantic change of the information item on the visual element contained in the visual element unit; and determining the first correlation based on the property information and the influence mode.

15. At least one non-transitory machine-readable medium comprising instructions that, when executed by at least one processor, cause the at least one processor to perform operations to:
- in accordance with a determination that an original infographic is received, determine a group of visual element units from a visual element set comprised in the original infographic, a visual element unit in the group of visual element units representing an information item in the original infographic;
- determine a first correlation between a visual element contained in the visual element unit and the information item by determining property information and an influence mode of semantic changes on the visual element, and determining a second correlation between the visual element unit and a further visual element unit in the group of visual element units by determining layout relationships and correlation information between visual elements;
- generate a description for the original infographic by obtaining predetermined tags through a trained multi-tag prediction model to characterize the first correlation and the second correlation; and
- in accordance with a determination that an input of target information is detected, generate a target infographic by:
  - updating the visual element contained in the visual element unit based on the first correlation and the target information;
  - updating visual elements in the further visual element unit based on the second correlation and the updated visual element; and
  - generating the target infographic based on the updated visual elements and their relative positions in an available display area.

16. The at least one non-transitory machine-readable medium of claim 15, the instructions to determine the group of visual element units further comprising instructions to:
- divide the visual element set into a set of visual element clusters based on similarities of visual elements in the visual element set;
- determine a number of visual elements contained in respective visual element clusters in the set of visual element clusters;
- determine, based on the number, an anchor visual element cluster from the set of visual element clusters; and
- determine the group of visual element units based on the anchor visual element cluster.

17. The at least one non-transitory machine-readable medium of claim 16, the instructions to determine the anchor visual element cluster further comprising instructions to:
- determine, based on the number, respective cluster sizes of the set of visual element clusters; and
- in accordance with a determination that a first cluster size of the respective cluster sizes exceeds a threshold size, determine the anchor visual element cluster from at least one visual element cluster having the first cluster size in the set of visual element clusters.

18. The at least one non-transitory machine-readable medium of claim 16, the instructions to determine the group of visual element units based on the anchor visual element cluster further comprising instructions to:
- determine visual elements contained in the anchor visual element cluster as anchor visual elements;
- assign non-anchor visual elements in a non-anchor visual element cluster to the anchor visual elements, the non-anchor visual element cluster having a same cluster size as the anchor visual element cluster; and
- determine the group of visual element units based on the anchor visual elements and the non-anchor visual elements assigned to the anchor visual elements.

19. The at least one non-transitory machine-readable medium of claim 15, the instructions to determine the first correlation further comprising instructions to:
- determine property information of the visual element contained in the visual element unit;
- determine an influence mode of a semantic change of the information item on the visual element contained in the visual element unit; and
- determine the first correlation based on the property information and the influence mode.

20. The at least one non-transitory machine-readable medium of claim 19, wherein the influence mode comprises at least one of:
- causing a morphing of the visual element,
- causing a movement of the visual element,
- failing to cause a change in the visual element,
- causing a change of the visual element in color, and
- causing a change of the visual element in arrangement and combination.

* * * * *